US008654389B2

United States Patent
Sakai

(10) Patent No.: US 8,654,389 B2
(45) Date of Patent: Feb. 18, 2014

(54) IMAGE FORMING APPARATUS, INSTALLATION METHOD, AND STORAGE MEDIUM

(75) Inventor: Katsuya Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 196 days.

(21) Appl. No.: 13/273,828

(22) Filed: Oct. 14, 2011

(65) Prior Publication Data

US 2012/0092729 A1   Apr. 19, 2012

(30) Foreign Application Priority Data

Oct. 19, 2010   (JP) .................................. 2010-234920

(51) Int. Cl.
*G06K 15/00* (2006.01)
(52) U.S. Cl.
USPC ........... 358/1.16; 358/1.9; 358/524; 717/172; 717/173; 717/168; 717/174
(58) Field of Classification Search
USPC .......... 358/1.9, 1.16, 524; 717/172, 173, 168, 717/174, 177, 178
See application file for complete search history.

(56) References Cited

U.S. PATENT DOCUMENTS

2007/0006324 A1* 1/2007 Osada et al. ..................... 726/27
2009/0274304 A1* 11/2009 Kobayashi ..................... 380/277

FOREIGN PATENT DOCUMENTS

JP         2004-139149         5/2004

* cited by examiner

*Primary Examiner* — King Poon
*Assistant Examiner* — Jamares Q Washington
(74) *Attorney, Agent, or Firm* — Canon U.S.A., Inc., IP Division

(57) ABSTRACT

Installing an application that is executed by an image forming apparatus includes detecting connection of an external storage device, requesting, if the external storage device whose connection is detected contains application data and device data including apparatus identification information identifying an image forming apparatus in which the application is installed and application identification information identifying the application installed in the image forming apparatus, license data on the application data identified based on the application identification information to the image forming apparatus identified by the apparatus identification information, and installing, in response to the request, the application data stored in the external storage device by using the license data if the license data is successfully acquired from the image forming apparatus identified by the apparatus identification information.

6 Claims, 14 Drawing Sheets

FIG.4A

```
/
├─Applications/
│  └─workflow/
│       ├─workflow.jar
│       └─workflow.lic
├─...
└─...
```

FIG.4B

```
workflow.jar
├─META-INF/
│   └─MANIFEST.MF
└───workflow.enc
```

FIG.4C

```
Application-ID:ff000425-0120-0110-0119-011400000001
Application-Name:Workflow
Application-Version:1.1.0
Vendor:ABCD Inc.
Memory:1024k
File-Space:4096k
```

FIG.4D

```
License-Version:1.0
License-ID:0000abcd-0123-4567-89ab-000011112222
Application-ID:ff000425-0120-0110-0119-011400000001
Print-Large:200
Print-Small:200
Key:1,#$R,S0U-C<X.6%B8V1E9@H"
```

FIG.4E

```
License-Version:1.0
License-ID:0123456-789a-bcde-ffff-111122223333
Application-ID:ff000425-0120-0110-0119-011400000001
Print-Large:150
Print-Small:195
Key:1,#$R,S0U-C<X.6%B8V1E9@H"
```

FIG.5

| USB IDENTIFICATION NUMBER (501) | APPLICATION ID (502) |
|---|---|
| 0xAA01 | ff000425-0120-0110-0119-011400000001 |
| 0xAB01 | 11111111-2222-3333-4444-5566778899aa |

1103 — Host-Address:192.168.0.11
1104 — Application-ID:ff000425-0120-0110-0119-011400000001

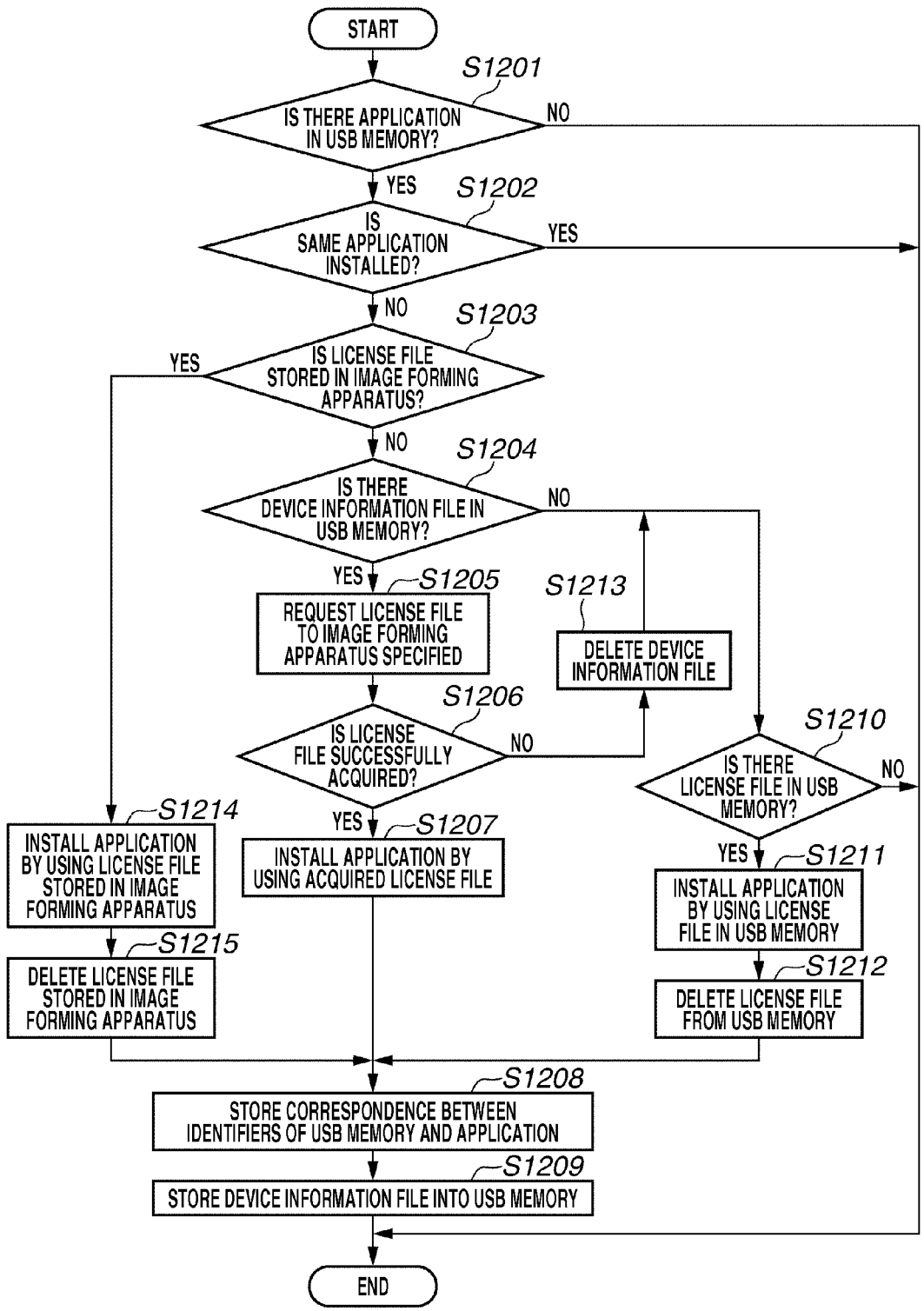

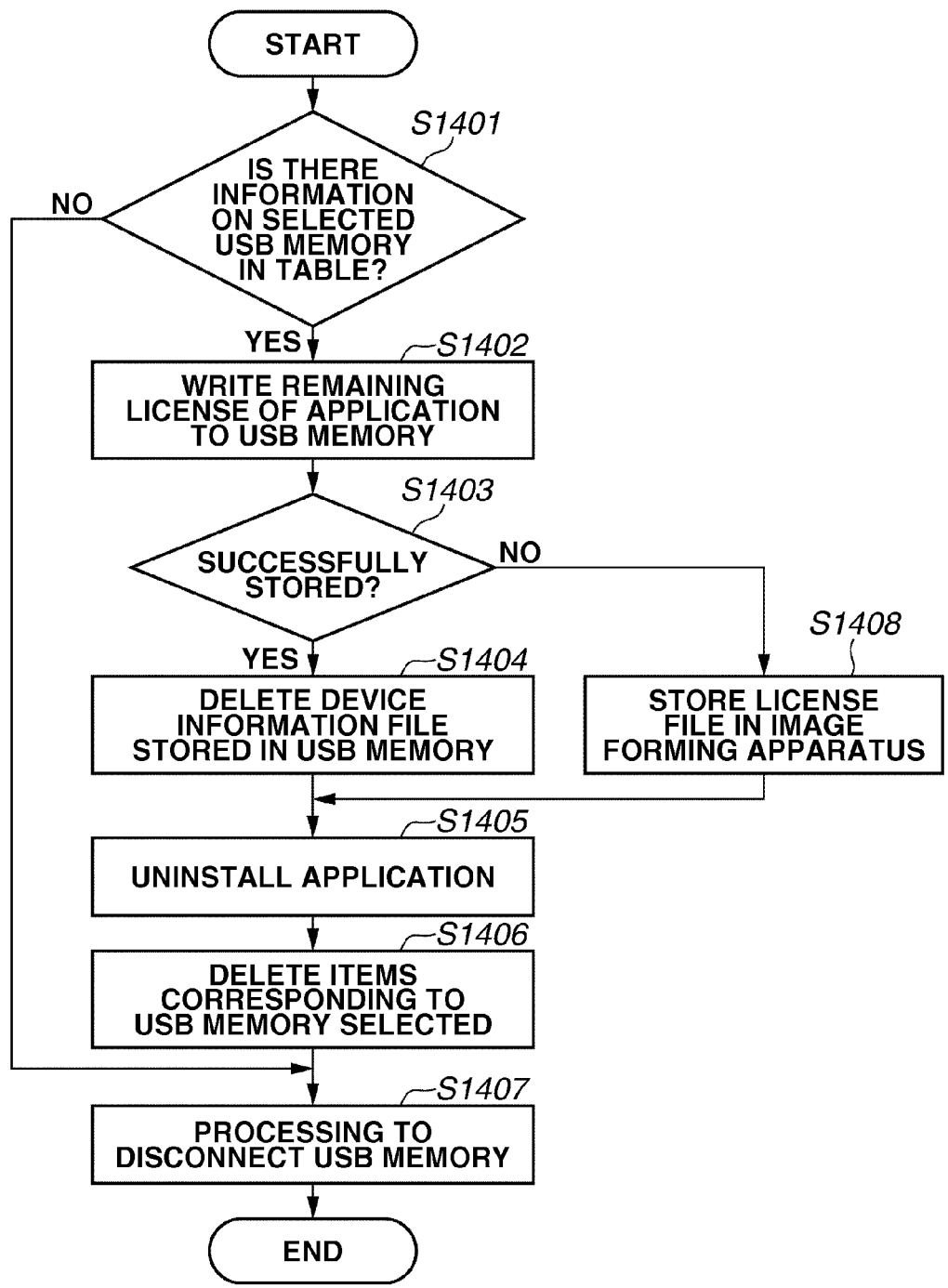

IMAGE FORMING APPARATUS, INSTALLATION METHOD, AND STORAGE MEDIUM

BACKGROUND OF THE INVENTION

1. Field of the Invention

The present invention relates to an image forming apparatus for controlling installation of applications, an installation method, and a storage medium.

2. Description of the Related Art

Conventional image forming apparatuses can be extended in functionality by installing applications. To implement restrictions on the duration of use of an application and the number of times of printing, such image forming apparatuses are configured to have applications installed in combination with respective license files in which restriction information is embedded.

For the sake of preventing unauthorized use, conventional image forming apparatuses are configured so that used license files cannot be installed in the same image forming apparatuses again. Such image forming apparatuses have an upper limit on resources (memory and storage capacities) available for applications, within which range a plurality of applications can be freely installed in combination as discussed in Japanese Patent Application Laid-Open No. 2004-139149.

Apparatuses with less available resources, such as a low-end image forming apparatus, are not able to have a large number of applications installed and used at a time. One possible approach is to store an application and a license file in a universal serial bus (USB) memory and install/uninstall the application in association with the insertion/removal of the USB memory. This approach facilitates switching different types of applications and is therefore considered effective even for devices with less available resources.

External storage devices like a USB memory can be removed by force. In this case, it is not possible with the foregoing configuration to write back the license file. This has caused a problem because the application data such as an application file cannot be installed again.

SUMMARY OF THE INVENTION

The present invention is thus directed to enabling installation of an application that requires license data, even if an external storage device is forcibly removed.

According to an aspect of the present invention, an image forming apparatus includes a detection unit configured to detect connection of an external storage device, a request unit configured to send a request for, if the external storage device whose connection is detected by the detection unit contains application data and device data including apparatus identification information identifying an image forming apparatus in which the application is installed and application identification information identifying the application installed in the image forming apparatus, license data on the application data identified based on the application identification information to the image forming apparatus identified by the apparatus identification information, and a management unit configured to install the application data stored in the external storage device by using the license data if the license data is successfully acquired from the image forming apparatus identified by the apparatus identification information in response to the request by the request unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A to 4E are diagrams illustrating an example of an application and a license file stored in a USB memory.

FIG. 5 is a chart illustrating an example of an application management table that a USB application management unit retains inside when a USB memory is connected and an application is installed.

FIG. 12 is a flowchart illustrating a processing procedure of a USB application management unit of an image forming apparatus according to the second exemplary embodiment when the USB application management unit is notified by a USB device detection unit of the connection of a USB memory.

FIG. 14 is a flowchart illustrating a processing procedure of the USB application management unit when a USB memory is selected and the OK button is pressed on the screen for selecting a USB memory to remove.

DESCRIPTION OF THE EMBODIMENTS

Various exemplary embodiments, features, and aspects of the invention will be described in detail below with reference to the drawings.

Figure 1:
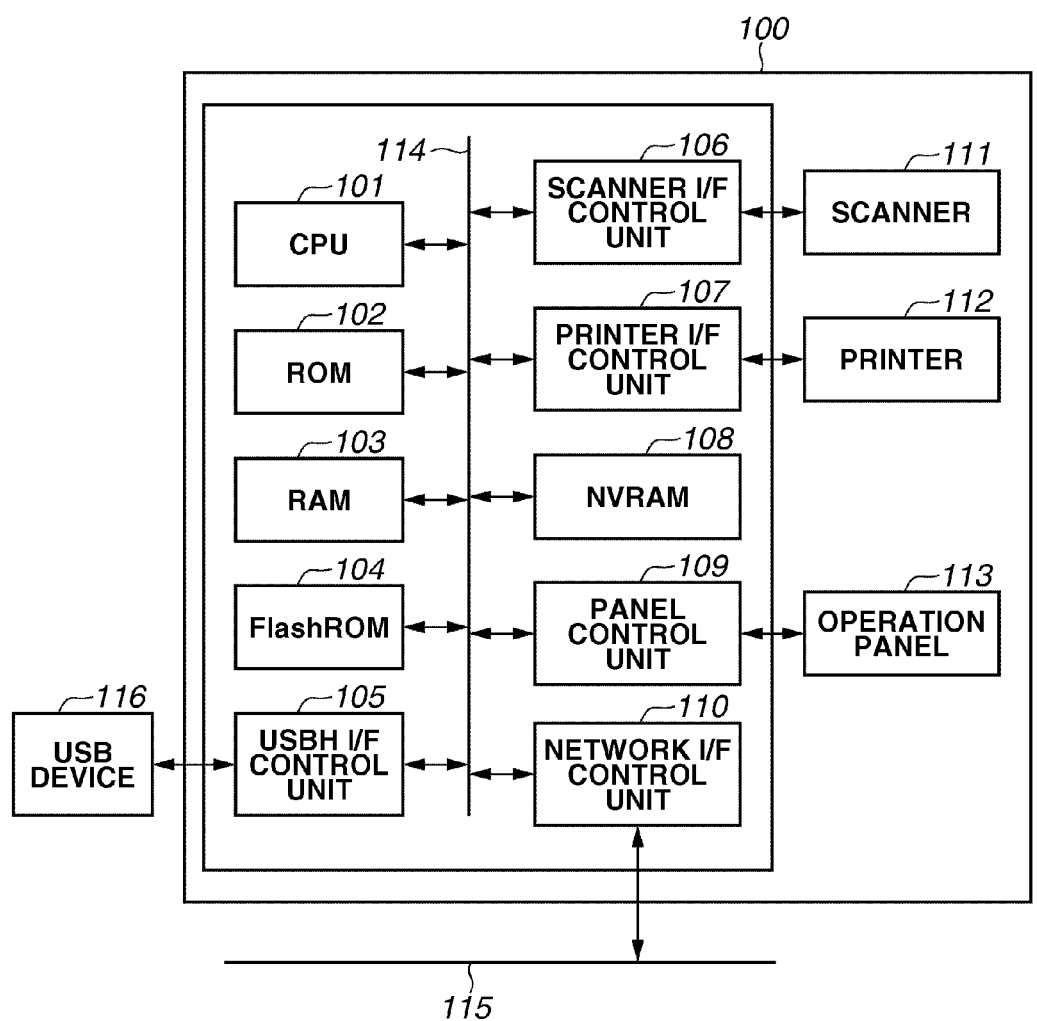
FIG. 1 is a block diagram illustrating an example of the hardware configuration of an image forming apparatus.

FIG. 1 is a diagram illustrating an example of the hardware configuration of an image forming apparatus 100.

A central processing unit (CPU) 101 executes software programs of the image forming apparatus 100 to control the entire image forming apparatus 100. A read-only memory (ROM) 102 contains a boot program of the image forming apparatus 100 and fixed parameters. A random access memory (RAM) 103 is used to store temporary data when the CPU 101 controls the image forming apparatus 100.

A FlashROM 104 is a rewritable nonvolatile memory. The FlashROM 104 is used to store various types of data, including installed applications (application files), application data, and print data. A universal serial bus host (USBH) interface (I/F) 105 is for USB host interface control. The USBH I/F 105 controls communications with various USB devices.

A scanner I/F control unit 106 is a device for controlling a scanner 111. A printer I/F control unit 107 is a device for controlling a printer 112. A nonvolatile random access memory (NVRAM) 108 is a nonvolatile memory for storing various settings of the image forming apparatus 100.

A panel control unit 109 controls an operation panel 113 to display various kinds of information and input user instructions. A network I/F control unit 110 controls transmission and reception of data to/from a local area network (LAN) 115.

The CPU 101, ROM 102, RAM 103, FlashROM 104, USBH I/F 105, scanner I/F control unit 106, printer I/F control unit 107, NVRAM 108, panel control unit 109, and network I/F control unit 110 are connected to a bus 114. The bus 114 is a system bus through which control signals from the CPU 101 are transmitted and received, and through which data signals are transmitted and received between the devices mentioned above. A USB device 116 is a USB memory, a USB keyboard, or other USB devices.

In the first exemplary embodiment, the user can install an application in the FlashROM 104 by connecting a USB memory containing the application to the image forming apparatus 100.

The CPU 101 executes programs to implement the processing according to a software configuration and flowcharts to be described below.

An application or application file is an example of application data. A USB device is an example of an external storage device.

Figure 2:
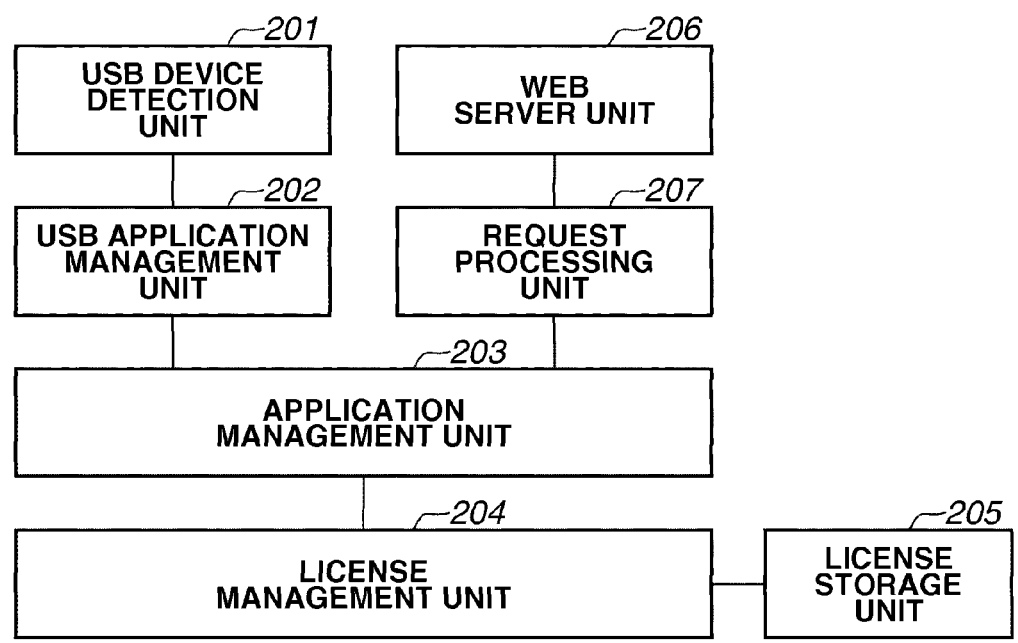
FIG. 2 is a block diagram illustrating an example of software configuration for managing applications running on the image forming apparatus.

FIG. 2 is a block diagram illustrating an example of software configuration for managing applications running on the image forming apparatus 100.

A USB device detection unit 201 detects connection or removal of a USB memory, and notifies other software modules of the connection or removal. A USB application management unit 202 manages an application contained in a USB memory when the USB memory is connected.

For example, when a USB memory is connected to the image forming apparatus 100, the USB application management unit 202 performs control through an application management unit 203 to install an application included in the USB memory and to start the application.

When a USB memory is removed from the image forming apparatus 100, the USB application management unit 202 performs control through the application management unit 203 to stop and uninstall an installed application. The application management unit 203 manages applications running on the image forming apparatus 100.

A license management unit 204 verifies a license file in association with application installation, and generates a remaining license at the time of uninstallation. A license storage unit 205 renders a license that is attached to an application into a file, and stores the file when the application is uninstalled.

A web server unit 206 is a server that accepts requests from external devices. A request processing unit 207 performs control corresponding to requests received from a source external to the image forming apparatus 100. For example, the request processing unit 207 may receive a request from a web browser on an external device, and return an application management page to the requestor. The request processing unit 207 may receive an application management request and manage applications.

A license file is an example of license data.

Figure 3A:
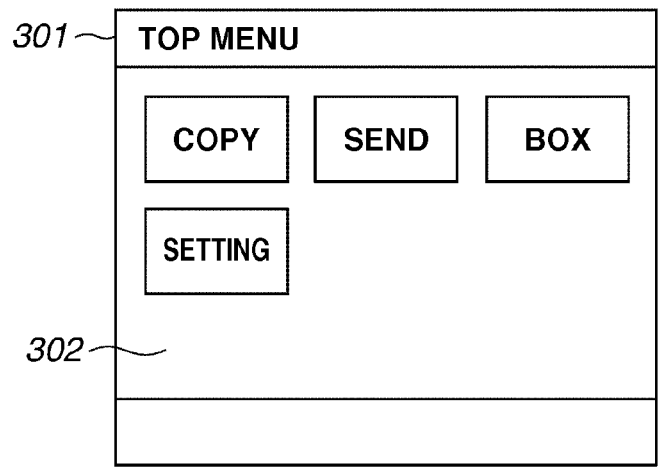
FIGS. 3A to 3C are diagrams illustrating examples of screens to be displayed on an operation panel of the image forming apparatus.
Figure 3B:
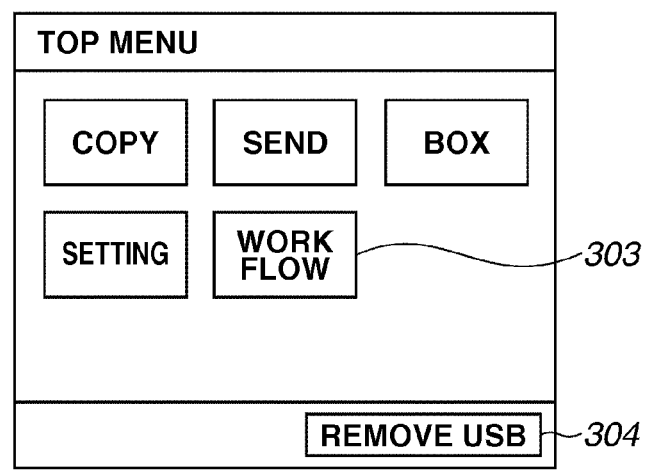
Figure 3C:
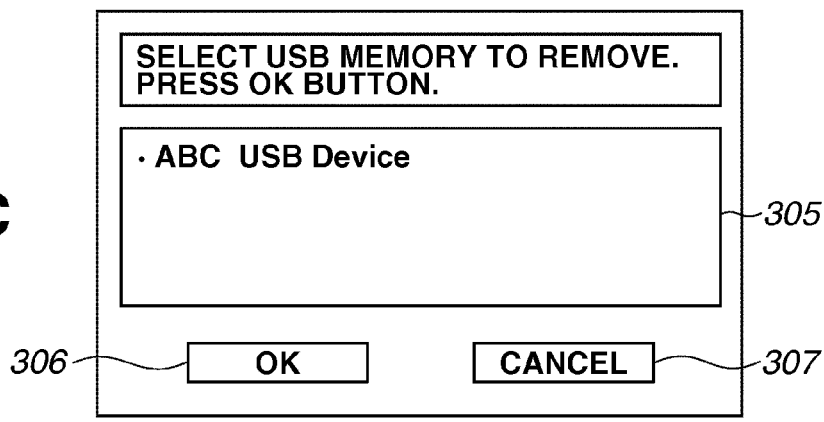

FIGS. 3A to 3C illustrate examples of screens to be displayed on the operation panel 113 of the image forming apparatus 100.

FIG. 3A illustrates a top menu screen 301 that is initially displayed when the image forming apparatus 100 is activated. An application button area 302 is an area where application buttons 303 are displayed. The application buttons 303 are used to shift the screens of respective installed applications.

FIG. 3B illustrates a screen that is displayed when a USB memory containing an application is connected. With the USB memory containing an application, the application contained in the USB memory is installed and its application button appears on the screen.

A remove USB button 304 is a button that is used to safely remove a USB memory. The remove USB button 304 is displayed when there is any USB memory connected. When the user presses the remove USB button 304, a screen for selecting a USB memory to be removed (FIG. 3C) appears.

A USB memory select area 305 is an area where USB memories currently connected are listed for user selection. When an OK button 306 is pressed, the application contained in a USB memory that is selected in the USB memory select area 305 is uninstalled from the image forming apparatus 100.

The USB memory is thereby unmounted to be safely removed. A cancel button 307 is a button for canceling removal of a USB memory. When the cancel button 307 is pressed, the screen simply returns to the previous one (for example, FIG. 3B).

FIGS. 4A to 4E are diagrams illustrating an example of an application and a license file stored in a USB memory. FIG. 4A is a diagram illustrating a directory structure in the USB memory. In the first exemplary embodiment, directories for respective applications are created under the Applications directory. An application file ("workflow.jar") and a license file ("workflow.lic") are located under each of the created directories. An application file ("workflow.jar") is a file into which a plurality of files is archived. The license file ("workflow.lic") is a file that contains encrypted license information.

FIG. 4B is a diagram illustrating an internal file structure of an application file ("workflow.jar"). The application file ("workflow.jar") includes an application attribute file ("MANIFEST.MF") and an encrypted application entity file ("workflow.enc").

FIG. 4C is a diagram illustrating an example of an application attribute file ("MANIFEST.MF"). The application attribute file ("MANIFEST.MF") defines Application-ID, Application-Name, Application-Version, Vendor, Memory, and File-Space attributes.

Application-ID is an ID for identifying the application. Application-Name defines the application name, which is used for display on an application management screen. Application-Version indicates the version of the application. Vendor indicates the vendor name of the application. Memory defines the maximum memory consumption of the application. File-Space defines the maximum storage capacity that the application consumes.

Memory and File-Space are information that is used to determine whether there are sufficient resources available for the operation of the application when the application management unit 203 starts the application. If there are no sufficient resources available, the image forming apparatus 100 cannot start the application.

FIG. 4D illustrates an example of information included in a license file. License-Version indicates the version of the format of the license file. License-ID is an ID for identifying the license file. The IDs of installed license files are stored inside the USB memory so that the same license files cannot be used again.

Application-ID is information for determining which license file the application corresponds to. Print-Large is information that indicates how many sheets of large size are allowed to be printed. Print-Small is information that indicates how many sheets of small size are allowed to be printed.

Key is a key information for decrypting the encrypted application entity file. As mentioned previously, the license file is encrypted, so that the user cannot directly view the contents. The key for decrypting the license file is built in the USB memory in an unextractable manner.

FIG. 4E illustrates an example of a license file that is written back when the application is uninstalled. The example illustrates a case where a license file is written back when the application is uninstalled after 50 sheets of large size and 5 sheets of small size are printed by using the application.

Print-Large has a value of 200 minus 50, i.e., 150 since 50 sheets of large size have been printed. Print-Small has a value of 200 minus 5, i.e., 195 since five sheets of small size have been printed. Since License-ID is an ID for identifying the license file, a different ID is assigned each time. The rest of the information is inherited from the original license file.

FIG. 5 is a chart illustrating an example of an application management table that the USB application management unit 202 retains when USB memories are connected and applications are installed.

A USB identification number 501 is a number for identifying a USB device. A USB driver assigns unique IDs device by device. An application ID 502 is an ID for identifying the type of the application. The value of Application-ID defined in the application attribute file is stored as the application ID 502.

Figure 6:
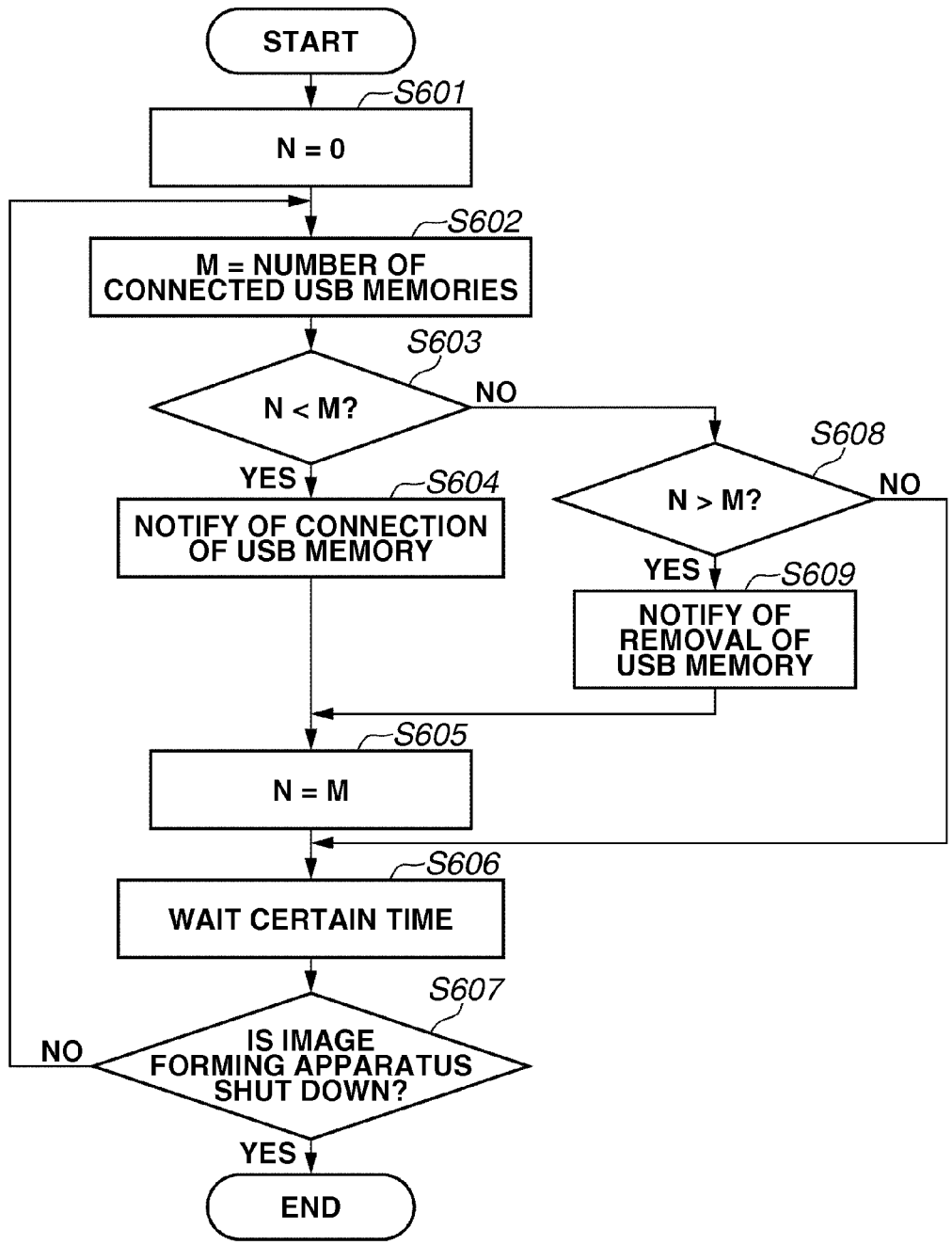
FIG. 6 is a flowchart illustrating a processing procedure when a USB device detection unit detects a USB memory.

FIG. 6 is a flowchart illustrating a processing procedure when the USB device detection unit 201 detects USB memories.

In step S601, the USB device detection unit 201 first initializes an internal variable N to zero. In step S602, the USB device detection unit 201 acquires the number of currently connected USB memories, and substitutes the number of USB memories into a variable M.

In step S603, the USB device detection unit 201 determines whether N is less than M. If N is less than M (YES in step S603), the processing proceeds to step S604. In step S604, the USB device detection unit 201 notifies the USB application management unit 202 of the connection of a new USB memory.

In step S605, the USB device detection unit 201 substitutes M into N. In step S606, the USB device detection unit 201 waits a certain time so that the USB memory detection processing will not occupy the CPU 101.

In step S607, the USB device detection unit 201 determines whether the image forming apparatus 100 is shut down. If the image forming apparatus 100 is not shut down (NO in step S607), the processing returns to step S602. If the image forming apparatus 100 is shut down (YES in step S607), the USB device detection unit 201 ends the processing.

If N is determined not to be less than M (NO in step S603), the processing proceeds to step S608. In step S608, the USB device detection unit 201 determines whether N is greater than M. If N is greater than M (YES in step S608), the processing proceeds to step S609.

In step S609, the USB device detection unit 201 notifies the USB application management unit 202 of the removal of a USB memory. Then, the processing proceeds to step S605. The subsequent processing is the same as that described above.

If N is determined not to be greater than M (NO in step S608), the processing proceeds to step S606 without notification processing since the number of USB memories connected is unchanged. The subsequent processing is the same as that described above.

Figure 7:
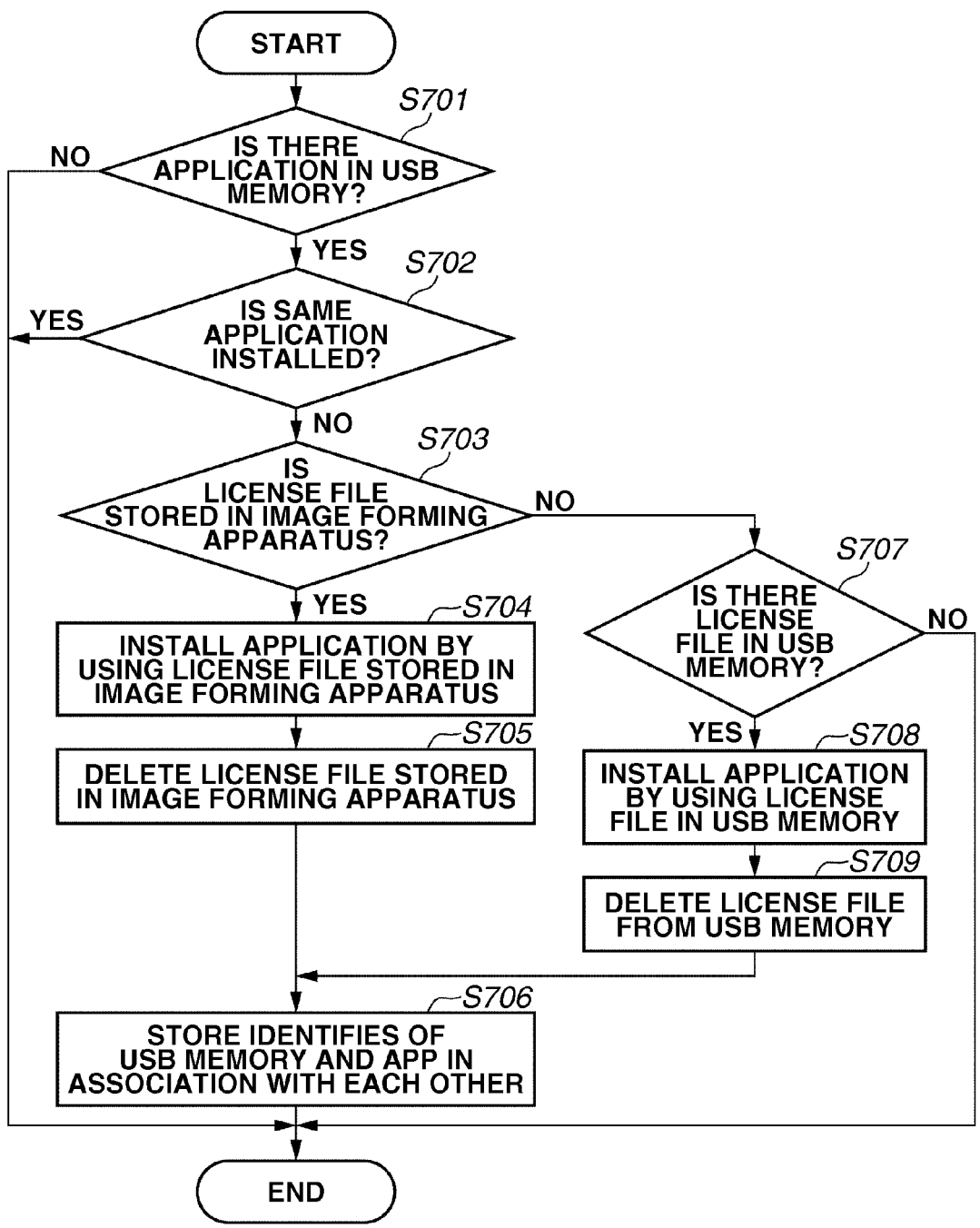
FIG. 7 is a flowchart illustrating a processing procedure of the USB application management unit when the USB application management unit is notified of the connection of a USB memory in step S604.

FIG. 7 is a flowchart illustrating a processing procedure of the USB application management unit 202 when the USB application management unit 202 is notified of the connection of a USB memory in step S604.

In step S701, the USB application management unit 202 notified thereof determines whether there is an application in a predetermined location of the USB memory. If there is no application in the predetermined location of the USB memory (NO in step S701), the USB application management unit 202 ends the processing. If there is an application (YES in step S701), the processing proceeds to step S702.

In step S702, the USB application management unit 202 acquires Application-ID from the application attributes, and determines whether the same application has been already installed. If the same application has already been installed (YES in step S702), the USB application management unit 202 ends the processing. If the same application is determined not to have already been installed (NO in step S702), the processing proceeds to step S703.

In step S703, the USB application management unit 202 determines whether a license file for the application is stored in the image forming apparatus 100. If there is the license file (YES in step S703), the processing proceeds to step S704. In step S704, the USB application management unit 202 installs the application by using the license file stored in the image forming apparatus 100.

In step S705, the USB application management unit 202 deletes the license file for the application, stored in the image forming apparatus 100.

In step S706, the USB application management unit 202 stores an identifier of the USB memory and an identifier of the application into the application management table (FIG. 5) in association with each other. The USB application management unit 202 then ends the processing.

The identifier of the USB device is an example of external storage device identification information.

If the license file is determined not to be stored in the image forming apparatus 100 (NO in step S703), the processing proceeds to step S707. In step S707, the USB application management unit 202 determines whether there is a license file in a predetermined location of the USB memory.

If it is determined that there is a license file (YES in step S707), the processing proceeds to step S708. In step S708, the USB application management unit 202 installs the application by using the license file in the USB memory. Then, the processing proceeds to step S709.

In step S709, the USB application management unit 202 deletes the license file used for the installation from the USB memory. Then, the processing proceeds to step S706. The subsequent processing is the same as that described above.

If it is determined that there is no license file in the USB memory (NO in step S707), the USB application management unit 202 ends the processing.

Figure 8:
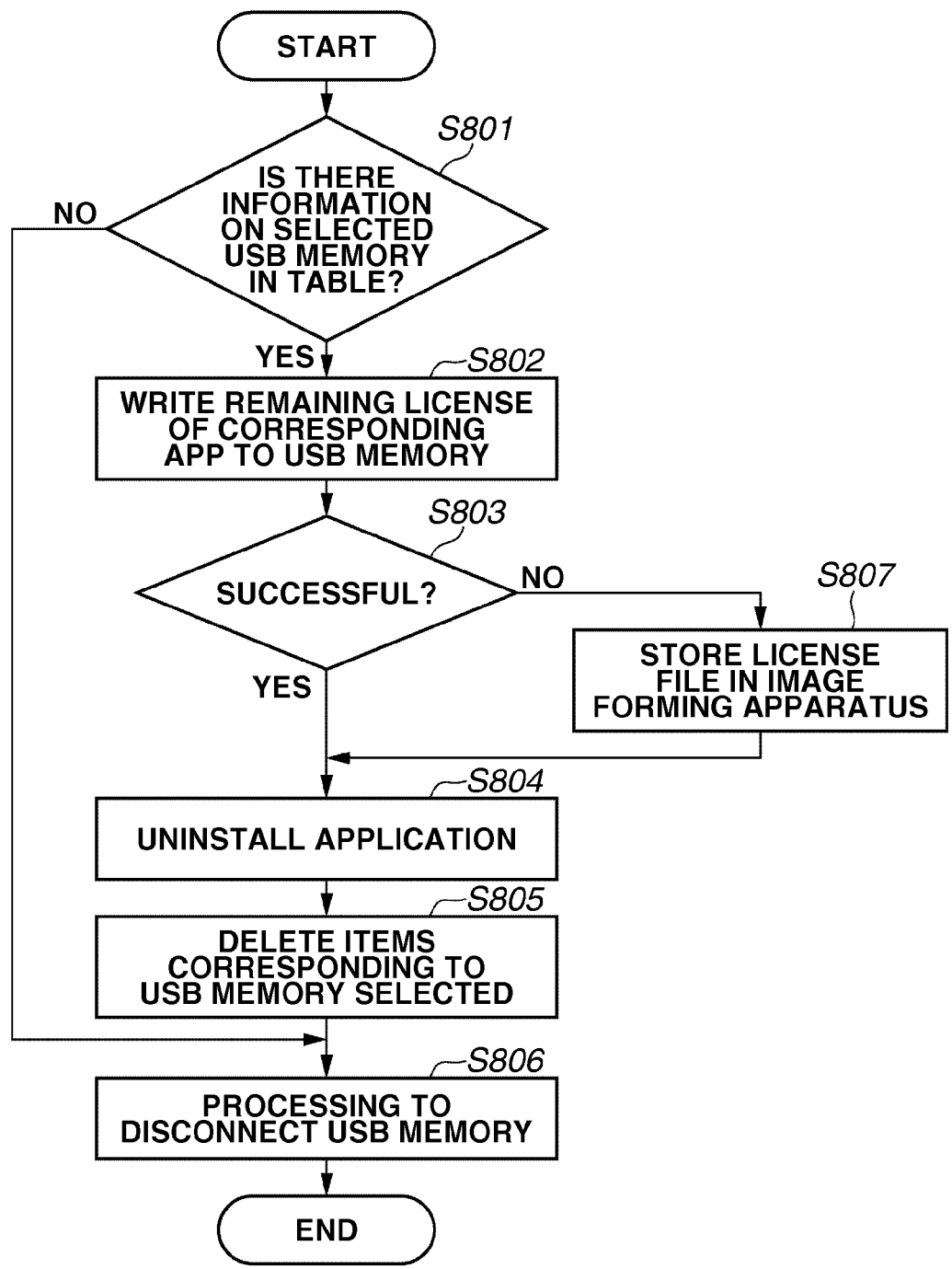
FIG. 8 is a flowchart illustrating a processing procedure of the USB application management unit when a USB memory is selected and an OK button is pressed on a screen for selecting a USB memory to remove.

FIG. 8 is a flowchart illustrating a processing procedure of the USB application management unit 202 when the remove USB button 304 is pressed on the screen of FIG. 3B, a USB memory is selected, and the OK button 306 is pressed on the screen for selecting a USB memory to remove (FIG. 3C).

Suppose that the user selects a USB memory and presses the OK button 306 on the screen for selecting a USB memory to remove (FIG. 3C). In step S801, the USB application management unit 202 checks whether there is information on the selected USB memory in the application management table. If the application management table contains the information (YES in step S801), the processing proceeds to step S802. In step S802, the USB application management unit 202 renders the remaining license of the corresponding application into a file and writes the file to the USB memory.

In step S803, the USB application management unit 202 determines whether the writing in the USB memory is successfully completed. If the writing in the USB memory is successfully completed (YES in step S803), the processing proceeds to step S804. If it is determined that the writing fails (NO in step S803), the processing proceeds to step S807.

In step S807, the USB application management unit 202 stores the license file in the image forming apparatus 100. Then, the processing proceeds to step S804. In step S804, the USB application management unit 202 uninstalls the application. Then, the processing proceeds to step S805. In step S805, the USB application management unit 202 deletes items corresponding to the selected USB memory from the application management table. Then, the processing proceeds to step S806.

If the application management table contains no information on the selected USB memory (NO in step S801), the processing proceeds to step S806.

In step S806, the USB application management unit 202 performs processing to disconnect the USB memory. The USB application management unit 202 then ends the processing. The disconnection processing decreases the number of USB memories to be acquired in step S602. The USB device detection unit 201 thus detects a decrease in the number of USB memories, and notifies the USB application management unit 202 of the removal of a USB memory.

Figure 9:
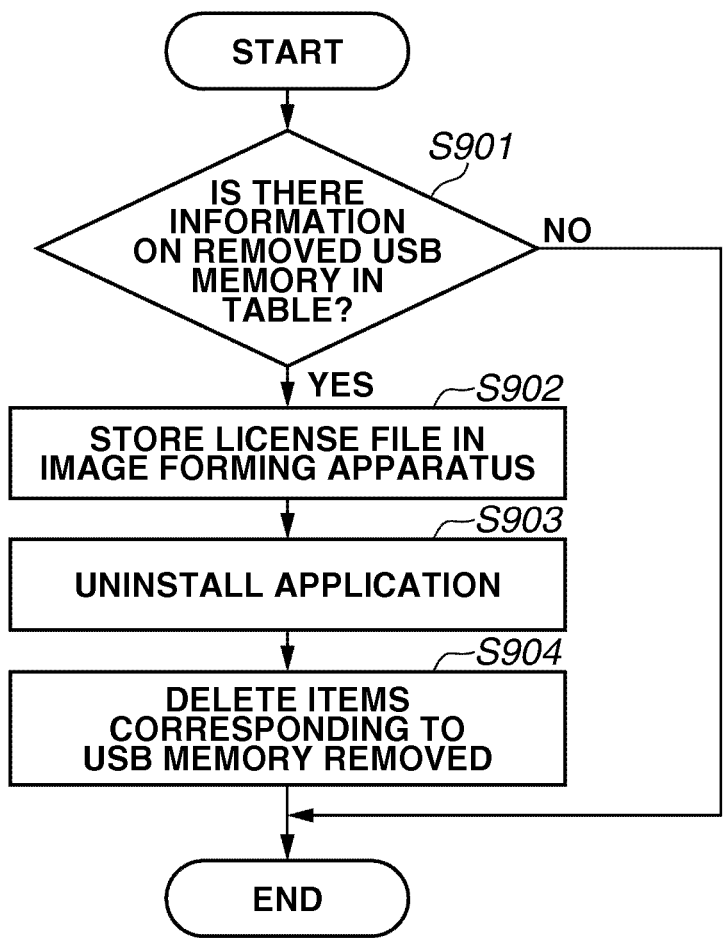
FIG. 9 is a flowchart illustrating a processing procedure of the USB application management unit when the USB application management unit is notified of the removal of a USB memory in step S609.

FIG. 9 is a flowchart illustrating the processing procedure of the USB application management unit 202 when the USB application management unit 202 is notified of the removal of a USB memory in step S609.

In step S901, the USB application management unit 202, notified of the removal of a USB memory, first checks whether there is information on the removed USB memory in the application management table.

The removal of a USB memory by a proper procedure entails the processing of FIG. 8. The application management table containing information on the USB memory means that the USB memory is forcibly removed.

If the application management table contains no information on the USB memory (NO in step S901), the USB application management unit 202 simply ends the processing. If the application management table is determined to contain the information (YES in step S901), the processing proceeds to step S902.

In step S902, the USB application management unit 202 renders the remaining license of the application associated by the application management table into a file, and stores the file in the image forming apparatus 100. Then, the processing proceeds to step S903. In step S903, the USB application management unit 202 uninstalls the application associated by the application management table. Then, the processing proceeds to step S904.

In step S904, the USB application management unit 202 deletes items corresponding to the removed USB memory from the application management table. The USB application management unit 202 then ends the processing.

Such a configuration enables reinstallation of the application to the same image forming apparatus 100 even if a license file cannot be written back to the USB memory for any reason such as the user removing the USB memory without an unmount operation.

Figure 10:
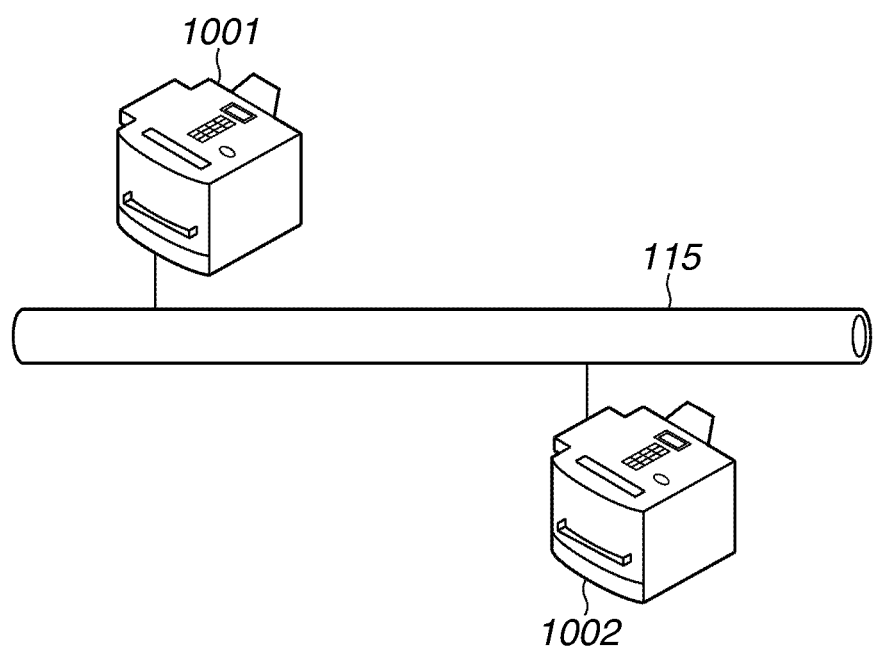
FIG. 10 is a diagram illustrating an example of the system configuration of a system according to a second exemplary embodiment.

Next, a second exemplary embodiment describes a configuration that enables installation of an application even if a USB memory that is forcibly removed is inserted into another image forming apparatus 100. FIG. 10 is a diagram illustrating an example of the system configuration of a system according to the second exemplary embodiment.

As illustrated in FIG. 10, the system of the present exemplary embodiment includes a plurality of image forming apparatuses 1001 and 1002 that are communicably connected over a network 115. The hardware configuration of the image forming apparatuses 1001 and 1002 according to the second exemplary embodiment, the software configuration for managing applications running on the image forming apparatuses 1001 and 1002, and examples of user interface (UI) screens when installing an application via a USB memory are the same as the image forming apparatus 100. Thus, a detailed description thereof is omitted herein.

When an image forming apparatus 1001 or 1002 according to the second exemplary embodiment successfully has an application installed from a USB memory, the image forming apparatus 1001 or 1002 writes its device information file into the USB memory. The image forming apparatus 1001 or 1002 deletes the device information file when an operation to remove the USB memory is performed.

Suppose that a USB memory is connected to an image forming apparatus 1002 according to the second exemplary embodiment, followed by installation processing. If the USB memory still contains a device information file of an image forming apparatus 1001, the image forming apparatus 1002 accesses the image forming apparatus 1001 over the network based on the information.

The image forming apparatus 1002 then attempts to acquire the license file from the image forming apparatus 1001. If the license file is successfully acquired, the image forming apparatus 1002 has the application installed by using the license file acquired.

The device information file is an example of device data.

Figures 11A, 11B:
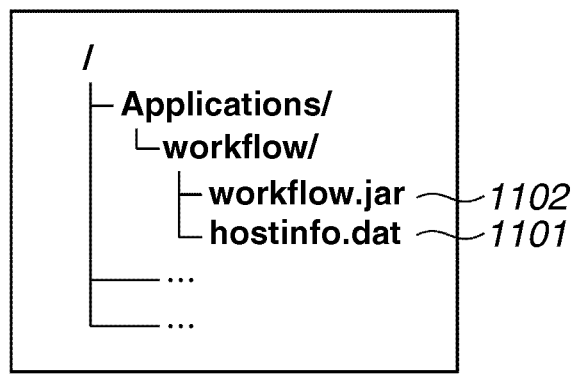
FIGS. 11A and 11B are diagrams illustrating an example of a device information file that an image forming apparatus stores in a USB memory.

FIGS. 11A and 11B are diagrams illustrating an example of a device information file that an image forming apparatus 1001 or 1002 stores in a USB memory. FIG. 11A is a diagram illustrating an example of the storage location of a device information file. The device information file 1101 is stored in the same folder as an application file 1102, under a filename of hostinfo.dat.

FIG. 11B is a diagram illustrating an example of the contents of a device information file. Host-Address 1103 is information on the IP address of a host in which the application is installed. Application-ID 1104 is identification information on the application installed. Like license files, device information files are encrypted when stored. This prevents users from counterfeiting the device information files.

Host-Address 1103 is an example of device identification information. Application-ID 1104 is an example of application identification information.

FIG. 12 is a flowchart illustrating a processing procedure of the USB application management unit 202 of an image forming apparatus 1001 or 1002 according to the second exemplary embodiment when the USB application management unit 202 is notified by the USB device detection unit 201 of the connection of a USB memory. For discussion purposes, image forming apparatus 1001 will be referred to in the following description of FIG. 12.

In step S1201, the USB application management unit 202 when notified determines whether there is an application in a predetermined location on the USB memory. If the USB memory contains no application (NO in step S1201), the USB application management unit 202 ends the processing. If the USB memory contains an application (YES in step S1201), the processing proceeds to step S1202.

In step S1202, the USB application management unit 202 acquires Application-ID from the application attribute, and determines whether the same application has been already installed. If the same application is already installed (YES in step S1202), the USB application management unit 202 ends the processing. If the same application is determined not to be installed (NO in step S1202), the processing proceeds to step S1203.

In step S1203, the USB application management unit 202 determines whether a license file for the application is stored in the image forming apparatus 1001. If there is no license file (NO in step S1203), the processing proceeds to step S1204. In step S1204, the USB application management unit 202 determines whether there is a device information file in the USB memory. If it is determined that there is a device information file (YES in step S1204), the processing proceeds to step S1205.

In step S1205, the USB application management unit 202 reads information on Host-Address and Application-ID from the device information file. The USB application management unit 202 then requests a license file specified by Application-ID 1104 from the image forming apparatus 1001 specified by Host-Address 1103.

In step S1206, the USB application management unit 202 determines whether the license file is successfully acquired. If the license file is determined to be successfully acquired (YES in step S1206), the processing proceeds to step S1207.

In step S1207, the USB application management unit 202 installs the application by using the acquired license file. Then, the processing proceeds to step S1208. In step S1208, the USB application management unit 202 stores the correspondence between the identifier of the USB memory and that of the application into the application management table (FIG. 5). Then, the processing proceeds to step S1209.

In step S1209, the USB application management unit 202 stores the device information file in the USB memory. The USB application management unit 202 then ends the processing.

If it is determined that there is no license file in the USB memory (NO in step S1204), the processing proceeds to step S1210.

In step S1210, the USB application management unit 202 determines whether there is a license file in a predetermined location of the USB memory. If it is determined that there is no license file (NO in step S1210), the USB application management unit 202 ends the processing. If it is determined that there is a license file (YES in step S1210), the processing proceeds to step S1211.

In step S1211, the USB application management unit 202 installs the application by using the license file in the USB memory. Then, the processing proceeds to step S1212. In step S1212, the USB application management unit 202 deletes the license file used for the installation from the USB memory. Then, the processing proceeds to step S1209.

More specifically, if the processing reaches step S1209 via steps S1210 to S1212, the USB application management unit 202 stores into the USB memory a device information file that includes the IP address of the image forming apparatus 1001 and application identification information for identifying the application installed in step S1211.

On the other hand, if the processing reaches step S1209 via step S1207, the USB application management unit 202 deletes the device information file contained in the USB memory. The USB application management unit 202 then stores into the USB memory a device information file that includes the IP address of the image forming apparatus 1001 and application identification information for identifying the application installed in step S1207.

The USB application management unit 202 may change Host-Address 1103 in the device information file contained in the USB memory into the IP address of the image forming apparatus 1001 instead of deleting the device information file.

If the license file is determined not to be acquired (NO in step S1206), the processing proceeds to step S1213. In step S1213, the USB application management unit 202 deletes the device information file from the USB memory. The processing then proceeds to step S1210.

If it is determined that there is a license file in the image forming apparatus 1001 (YES in step S1203), the processing proceeds to step S1214. In step S1214, the USB application management unit 202 installs the application by using the license file stored in the image forming apparatus 1001.

In step S1215, the USB application management unit 202 deletes the license file for the application, stored in the image forming apparatus 1001. The process then proceeds to step S1208.

Figure 13:
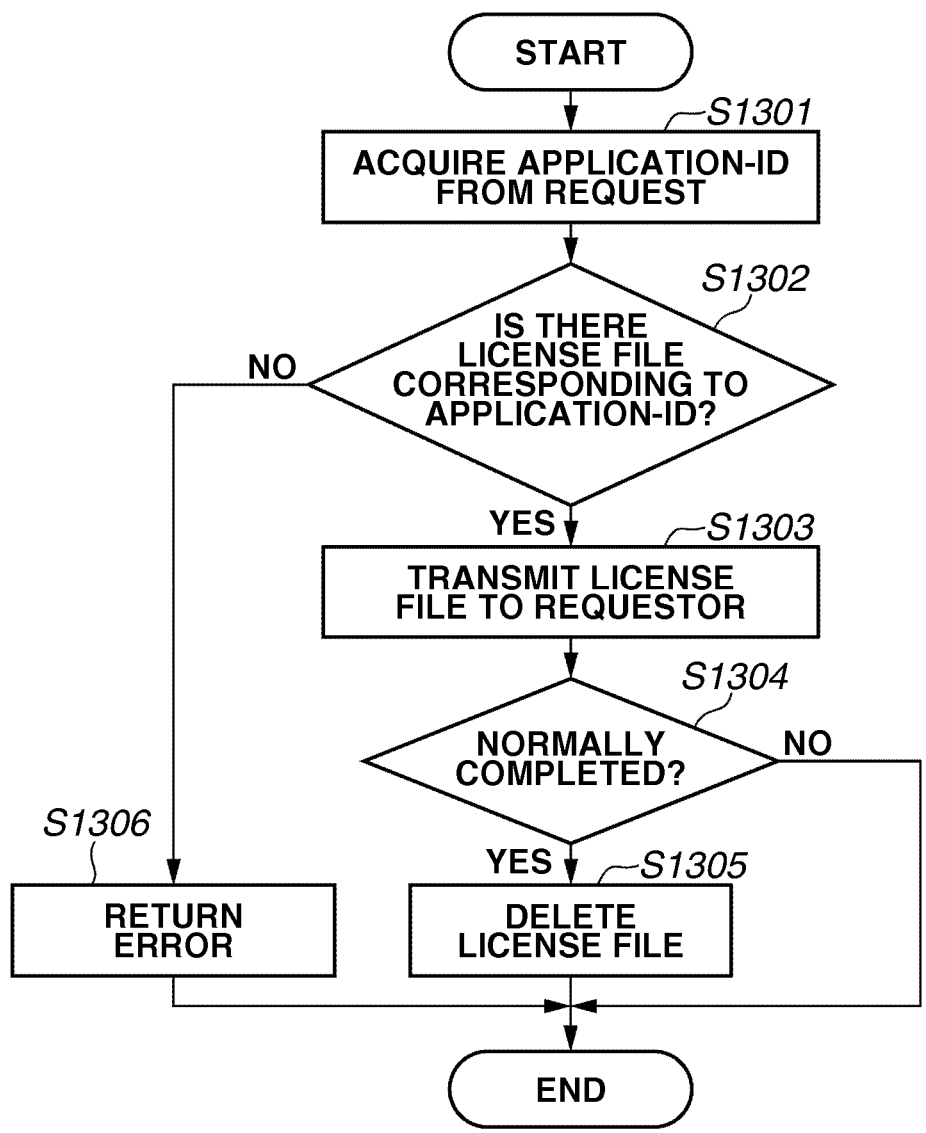
FIG. 13 is a flowchart illustrating a processing procedure when a request processing unit receives a license file acquisition request from a source external to the image forming apparatus.

FIG. 13 is a flowchart illustrating a processing procedure when the request processing unit 207 receives a license file acquisition request from a source external to the image forming apparatus 1001.

In step S1301, the request processing unit 207, receiving a license file acquisition request, first extracts information on Application-ID 1104 from the request.

In step S1302, the request processing unit 207 determines whether there is a license file corresponding to the application specified by Application-ID 1104 in the image forming apparatus 1001. If there is no corresponding license file (NO in step S1302), then in step S1306, the request processing unit 207 returns an error. The request processing unit 207 then ends the processing. If there is a corresponding license file (YES in step S1302), the processing proceeds to step S1303. In step S1303, the request processing unit 207 transmits the license file to the requestor.

In step S1304, the request processing unit 207 determines whether the transmission is normally completed. If the license file fails to be normally transmitted (NO in step S1304), the request processing unit 207 ends the processing. If the license file is normally transmitted (YES in step S1304), the processing proceeds to step S1305. In step S1305, the request processing unit 207 deletes the transmitted license file from the image forming apparatus 1001. The request processing unit 207 then ends the processing.

FIG. 14 is a flowchart illustrating a processing procedure of the USB application management unit 202 when the remove USB button 304 is pressed on the screen of FIG. 3B, and a USB memory is selected and the OK button 306 is pressed on the screen for selecting a USB memory to remove (FIG. 3C).

Suppose that the user selects a USB memory and presses the OK button 306 on the screen for selecting a USB memory to remove (FIG. 3C). In step S1401, the USB application management unit 202 checks whether there is information on the selected USB memory in the application management table. If the application management table contains information on the USB memory (YES in step S1401), the processing proceeds to step S1402. In step S1402, the USB application management unit 202 renders the remaining license of the corresponding application into a file and writes the file to the USB memory.

In step S1403, the USB application management unit 202 determines whether the writing in the USB memory is successfully completed. If the writing in the USB memory is successfully completed (YES in step S1403), the processing proceeds to step S1404. In step S1404, the USB application management unit 202 deletes the device information file stored in the USB memory. Then, the processing proceeds to step S1405.

If it is determined that the writing fails (NO in step S1403), the processing proceeds to step S1408. In step S1408, the USB application management unit 202 stores the license file in the image forming apparatus 1001. Then, the processing proceeds to step S1405.

In step S1405, the USB application management unit 202 uninstalls the application. Then, the processing proceeds to step S1406. In step S1406, the USB application management unit 202 deletes items corresponding to the selected USB memory from the application management table. Then, the processing proceeds to step S1407.

If the application management table contains no information on the selected USB memory (NO in step S1401), the processing proceeds to step S1407. In step S1407, the USB application management unit 202 performs processing to disconnect the USB memory. The USB application management unit 202 then ends the processing.

The disconnection processing decreases the number of USB memories to be acquired in step S602. The USB application management unit 202 is thus notified of the removal of a USB memory. Therefore, the USB application management unit 202 subsequently performs processing for the case where the removal of a USB memory is notified. The processing for the case where the removal of a USB memory is notified is the same as that in the first exemplary embodiment. Thus, a detailed description thereof is omitted herein.

As has been described above, according to the second exemplary embodiment, if a USB memory contains a device information file, an image forming apparatus receives a license file over a network and installs an application based on the information.

Consequently, even if the user forcibly removes a USB memory and inserts the USB memory into another image forming apparatus, the other image forming apparatus can install the application for improved user-friendliness.

In the present exemplary embodiment, the image forming apparatus 1001 transmits a license file stored therein to another image forming apparatus 1002 when the license file is requested by the image forming apparatus 1002. However, the image forming apparatus 1001 may transmit a license file in response to a request from other clients.

For example, the image forming apparatuses 1001 may transmit a license file to an external device in response to a request made by the external device via a browser. In such a case, the user may download the license file to an external device and store the downloaded license file into a USB memory. This allows reinstallation of an application in an image forming apparatus 1001.

An exemplary embodiment of the present invention may be realized by executing the following processing. The processing includes supplying software (program) for implementing the functions of the foregoing exemplary embodiments to a system or an apparatus over a network or through various types of computer-readable storage media, and a computer (CPU or MPU) of the system or apparatus reading and executing the program.

According to the exemplary embodiments described above, it is possible to reinstall a license-controlled application in an image forming apparatus even when a USB memory is forcibly removed. This allows easy replacement of applications that require license files by using USB memories.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-234920 filed Oct. 19, 2010, which is hereby incorporated by reference herein in its entirety.

What is claimed is:

1. An image forming apparatus comprising:
a processing unit coupled to a memory, the processing unit configured to control:
a detection unit configured to detect connection of an external storage device;
a request unit configured to send a request for, if the external storage device whose connection is detected by the detection unit contains application data and device data including apparatus identification information identifying an image forming apparatus in which the application is installed and application identification information identifying the application installed in the image forming apparatus, license data on the application data identified based on the application identification information to the image forming apparatus identified by the apparatus identification information;
a management unit configured to install the application data stored in the external storage device by using the license data if the license data is successfully acquired from the image forming apparatus identified by the apparatus identification information in response to the request by the request unit;
a storage unit configured to store external storage device identification information identifying the external storage device and the application identification information identifying the application in a storage device in association with each other after the application stored in the external storage device is installed; and
a save unit configured to store device data including apparatus identification information identifying the image forming apparatus and the application identification information in the external storage device.

2. The image forming apparatus according to claim 1, wherein if the license data in not successfully acquired from the image forming apparatus identified by the apparatus identification information in response to the request by the request unit, the management unit deletes the device data from the external storage device, installs the application stored in the external storage device by using license data stored in the external storage device, and deletes the license data stored in the external storage device.

3. The image forming apparatus according to claim 1,
wherein the management unit, if an operation to instruct removal of an external storage device is made and the storage device contains the application identification information associated with the external storage device identification information identifying the external storage device, stores remaining license data on an application identified by the application identification information in the external storage device,
wherein if the remaining license data is successfully stored, deletes device data stored in the external storage device and uninstalls the application,
wherein if the remaining license data is not stored successfully, stores application identification information identifying the application and the remaining license data on the application in the storage device in association with each other, and uninstalls the application.

4. The image forming apparatus according to claim 3, wherein the processing unit is further configured to control:
a reception unit configured to receive a request for license data including application identification information; and
a request processing unit configured to transmit the license data to a requestor if the license data is stored in the storage device, the license data being associated with the application identification information included in the request received by the reception unit.

5. A method for installing an application to be executed by an image forming apparatus, the method comprising:
detecting connection of an external storage device;
requesting, if the external storage device whose connection is detected contains application data and device data including apparatus identification information identifying an image forming apparatus in which the application data is installed and the application identification information identifying the application data installed in the image forming apparatus, license data on the application identified based on the application identification information to the image forming apparatus identified by the apparatus identification information;
installing, in response to the request, the application data stored in the external storage device by using the license data if the license data is successfully acquired from the image forming apparatus identified by the apparatus identification information;
storing external storage device identification information identifying the external storage device and the application identification information identifying the application in a storage device in association with each other after the application stored in the external storage device is installed; and
storing device data including the apparatus identification information identifying the image forming apparatus and the application identification information in the external storage device.

6. A non-transitory computer readable storage medium on which is stored a computer program for causing a computer to execute a method for installing an application to be executed by an image forming apparatus, the method comprising:
detecting connection of an external storage device;
requesting, if the external storage device whose connection is detected contains application data and device data including apparatus identification information identifying an image forming apparatus in which the application data is installed and the application identification information identifying the application data installed in the image forming apparatus, license data on the application identified based on the application identification information to the image forming apparatus identified by the apparatus identification information; and
installing, in response to the request, the application data stored in the external storage device by using the license data if the license data is successfully acquired from the image forming apparatus identified by the apparatus identification information;
storing external storage device identification information identifying the external storage device and the application identification information identifying the application in a storage device in association with each other after the application stored in the external storage device is installed; and
storing device data including the apparatus identification information identifying the image forming apparatus and the application identification information in the external storage device.

* * * * *